United States Patent
Hughes et al.

(10) Patent No.: US 6,679,014 B2
(45) Date of Patent: Jan. 20, 2004

(54) ROOFTOP WATER HEATER

(75) Inventors: Dennis R. Hughes, Hartford, WI (US); Marc W. Akkala, Cedarburg, WI (US); Kevin M. Field, Oconomowoc, WI (US); Randy T. Meyer, Garland, TX (US)

(73) Assignee: AOS Holding Company, Wilmington, DE (US)

( * ) Notice: Subject to any disclaimer, the term of this patent is extended or adjusted under 35 U.S.C. 154(b) by 0 days.

(21) Appl. No.: 10/274,183

(22) Filed: Oct. 18, 2002

(65) Prior Publication Data

US 2003/0041554 A1 Mar. 6, 2003

Related U.S. Application Data

(63) Continuation of application No. 09/732,472, filed on Dec. 7, 2000.

(51) Int. Cl.⁷ ................................................. F04C 2/52
(52) U.S. Cl. ..................................................... 52/220.1
(58) Field of Search ................................ 122/136, 233, 122/135.1, 155.1, 13.01, 136 R, 15.1, 19.2, 19.1; 52/220.1, 168, 27; 220/567.3; 248/674, 678, 346.01, 237

(56) References Cited

U.S. PATENT DOCUMENTS

| | | |
|---|---|---|
| 1,847,431 A | 3/1932 | Hanna |
| 3,028,843 A | 4/1962 | Carlson et al. |
| 3,903,868 A | 9/1975 | Salvo |
| 4,232,656 A * | 11/1980 | Teagan ........................ 126/588 |
| 4,414,464 A | 11/1983 | Cloutier |
| 4,497,281 A | 2/1985 | Markus |
| 4,501,232 A | 2/1985 | Gordbegli et al. |
| 4,771,762 A | 9/1988 | Bridegum |
| 4,785,792 A | 11/1988 | Saint Laurent |
| 4,809,523 A * | 3/1989 | Vandenberg .................. 62/483 |
| 4,867,106 A | 9/1989 | Staats |
| 4,875,465 A | 10/1989 | Kramer |
| 4,917,077 A | 4/1990 | Scanferla |
| 4,938,204 A | 7/1990 | Adams |
| 4,981,112 A | 1/1991 | Adams et al. |
| 5,582,026 A | 12/1996 | Barto, Sr. |
| 5,713,310 A | 2/1998 | Lemke |
| 5,749,415 A | 5/1998 | Dinh |
| 5,761,379 A | 6/1998 | Lannes |
| 5,915,960 A | 6/1999 | Check et al. |
| 6,062,174 A | 5/2000 | Abe |

FOREIGN PATENT DOCUMENTS

JP 2000304351 A 11/2000

* cited by examiner

*Primary Examiner*—Carl D. Friedman
*Assistant Examiner*—Steve Varner
(74) *Attorney, Agent, or Firm*—Michael Best & Friedrich LLP

(57) ABSTRACT

A method and apparatus for mounting a water heater on the roof of a building or at another location outside of the building. A roof curb surrounds a hole in the roof, and a base member is mounted to the roof curb. Alternatively, the base member is mounted on a concrete pad at ground level. A water tank is mounted to the base member with the longitudinal axis of the water tank extending horizontally. Support rails are mounted to the base member, and wedge-shaped supports are mounted to the support rails. The wedge-shaped supports are interconnected with tank mounted brackets that are mounted to the sides of the water tank. Thermally insulated spacers are interposed between the wedge-shaped supports and the tank mounting brackets.

29 Claims, 7 Drawing Sheets

ROOFTOP WATER HEATER

CROSS-REFERENCE TO RELATED APPLICATIONS

This application is a continuation of U.S. application Ser. No. 09/732,472, filed Dec. 7, 2000, the entire contents of which are incorporated by reference herein.

FIELD OF THE INVENTION

The invention relates to water heaters, and more particularly to water heaters adapted to be mounted on the roof of a building.

BACKGROUND

It is known to provide a water heater within a building, and to mount other equipment (e.g., HVAC equipment) on the roof of a building. A primary concern with rooftop equipment is the load imposed on the roof by the weight of the equipment. Most rooftop equipment is supported on the roof by a roof curb. The roof curb provides a weather-tight seal between the equipment and the roof, and distributes the weight load of the equipment to the building's roof. The roof curb also prevents leakage of water into the building and equipment in the event of a roof flood. Roof curbs are typically built to match the pitch of the roof so that the equipment mounts on a level surface. Rooftop equipment is typically raised to the roof with a crane and set on the roof curb. A foam sealing tape is often used between the bottom of the equipment and the roof curb to provide a weather-tight seal.

Many commercial buildings include a wall around the rooftop to screen the rooftop equipment from view. Much of the HVAC equipment currently installed on rooftops is enclosed in a rectangular cabinet, and has a sufficiently low profile to be not visible from the ground level.

SUMMARY

The present invention identifies several advantages to providing a water heater on the roof of a building. In commercial applications, one factor affecting many aspects of some businesses, and particularly retail and restaurant businesses, is floor space. Moving a water heater out of a building and positioning it on the building's roof may permit more floor space to be used for conducting business. In addition to potentially freeing up floor space and the need for a separate boiler room in a building, the present invention provides other advantages over interior water heaters. For example, the design of interior water heaters must account for such considerations as flooding, CO generation, interior noise, some fire hazards arising from flammable vapors, building depressurization, and exhaust venting. While interior water heaters are sometimes limited to a significant degree by such design concerns, a rooftop water heater embodying the present invention is typically not affected to the same extent. This may make design and maintenance of the rooftop water heater simpler and cheaper in some instances when compared to the design and maintenance of interior water heaters.

Several design parameters are imposed on the design of a rooftop water heater by weather conditions and the expectations of potential purchasers of such water heaters. The water heater must first account for weather conditions not normally encountered by interior water heaters. It would be desirable to mount the water heater on a weather-tight roof curb that would support the water heater above expected water levels in the event of a roof flood. The roof curb would also provide the required weight load distribution to the roof. Because roof curbs are already used to support other rooftop equipment, it is convenient to use a roof curb to support a rooftop water heater as well.

To maintain the aesthetics of their buildings, purchasers would likely want equipment that cannot be ordinarily seen from the ground level. The water heater therefore must have a sufficiently low profile and be of substantially the same height as most HVAC equipment to meet the expected demands of purchasers.

In light of the foregoing considerations, the present invention provides a rooftop water heater that includes a water tank mounted on a base member which is in turn mounted on a roof curb. The base member includes a drain communicating with the building's sewage system so that water leaking or otherwise flowing out of the water tank is drained away from the water heater without causing damage to the roof or the water heater itself. A pair of rails may be mounted under the base member such that the water heater and base member may be moved with a fork lift. The rails also include holes for accepting the hooks of a lifting crane for raising the water heater to the roof of the building.

The water tank is preferably generally cylindrical in shape with a longitudinal axis extending substantially horizontally. In this regard, the tank has a low profile compared to a tank having its longitudinal axis extending vertically. A head encloses one end of the tank. A plurality of water pipes extend up through the roof curb and through a water pipe aperture in the base member. A vertical wall surrounds the water pipe aperture. A grommet fits over the vertical wall and seals the water pipes with respect to the base member.

A plurality of panels, including a cabinet door and a top, are preferably interconnected with and supported by the base member to substantially weather-tightly enclose the water tank. The top and cabinet door may be removed from the other panels to permit access to the water tank.

A U-shaped flue tube is preferably contained within the water tank. A baffle or turbulator is positioned within one of the legs of the U-shaped flue tube. The ends of the flue tube extend through the head of the tank. The legs each include a longitudinal axis, and the longitudinal axes together define a flue plane that may be disposed substantially vertically, or may be angled with respect to vertical. Preferably, the flue plane is angled in the range of 30–60° with respect to vertical.

The water heater also includes inlet and outlet tubes for providing cold water to the tank and drawing hot water from the tank, respectively. The inlet and outlet tubes extend substantially the entire inside length of the tank, and preferably include a plurality of apertures facing in a single direction. The outlet tube is positioned in the top portion of the tank with its apertures facing up while the inlet tube is positioned in the bottom portion of the tank with its apertures facing down. Preferably, the inlet and outlet tubes extend through the head of the tank, but in an alternative construction, the inlet and outlet tubes include elbows that extend through the tank shell.

Other features and advantages of the invention will become apparent to those skilled in the art upon review of the following detailed description, claims, and drawings.

BRIEF DESCRIPTION OF THE DRAWINGS

FIG. 7 is a perspective view of the tank assembly of FIG. 4 with selected elements removed for the purpose of illustration.

Figure 1:
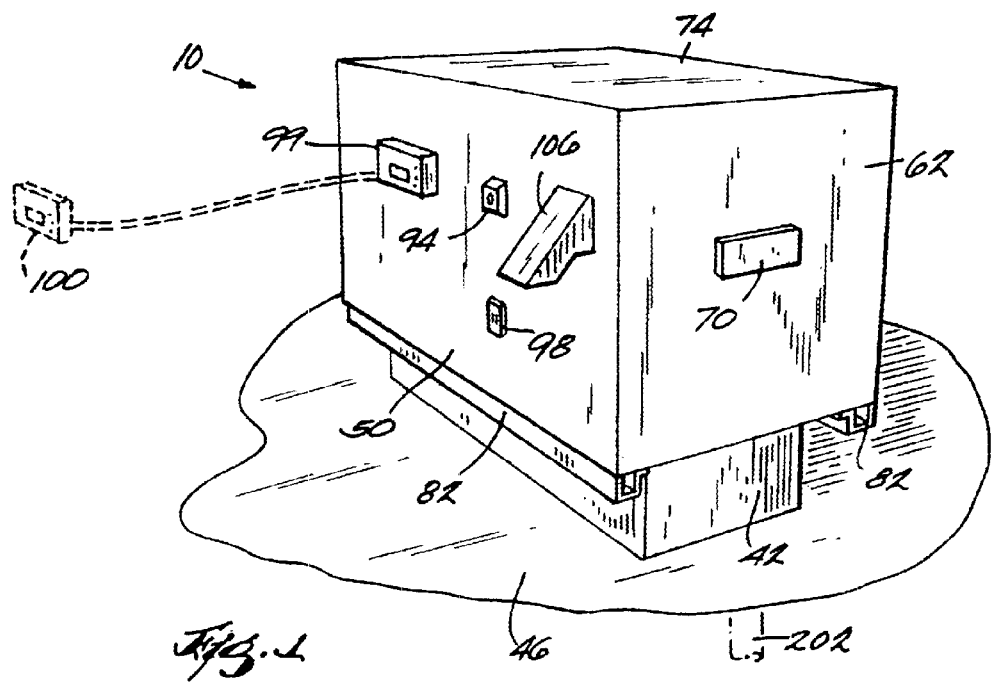
FIG. 1 is a perspective view of a water heater embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Figure 2:
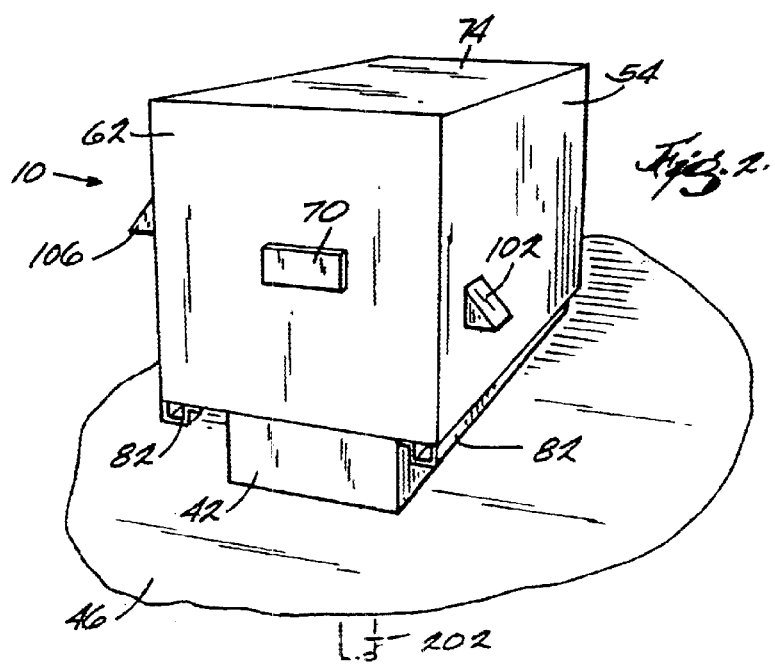
FIG. 2 is a view of the water heater of FIG. 1 from a different perspective.
Figure 3:
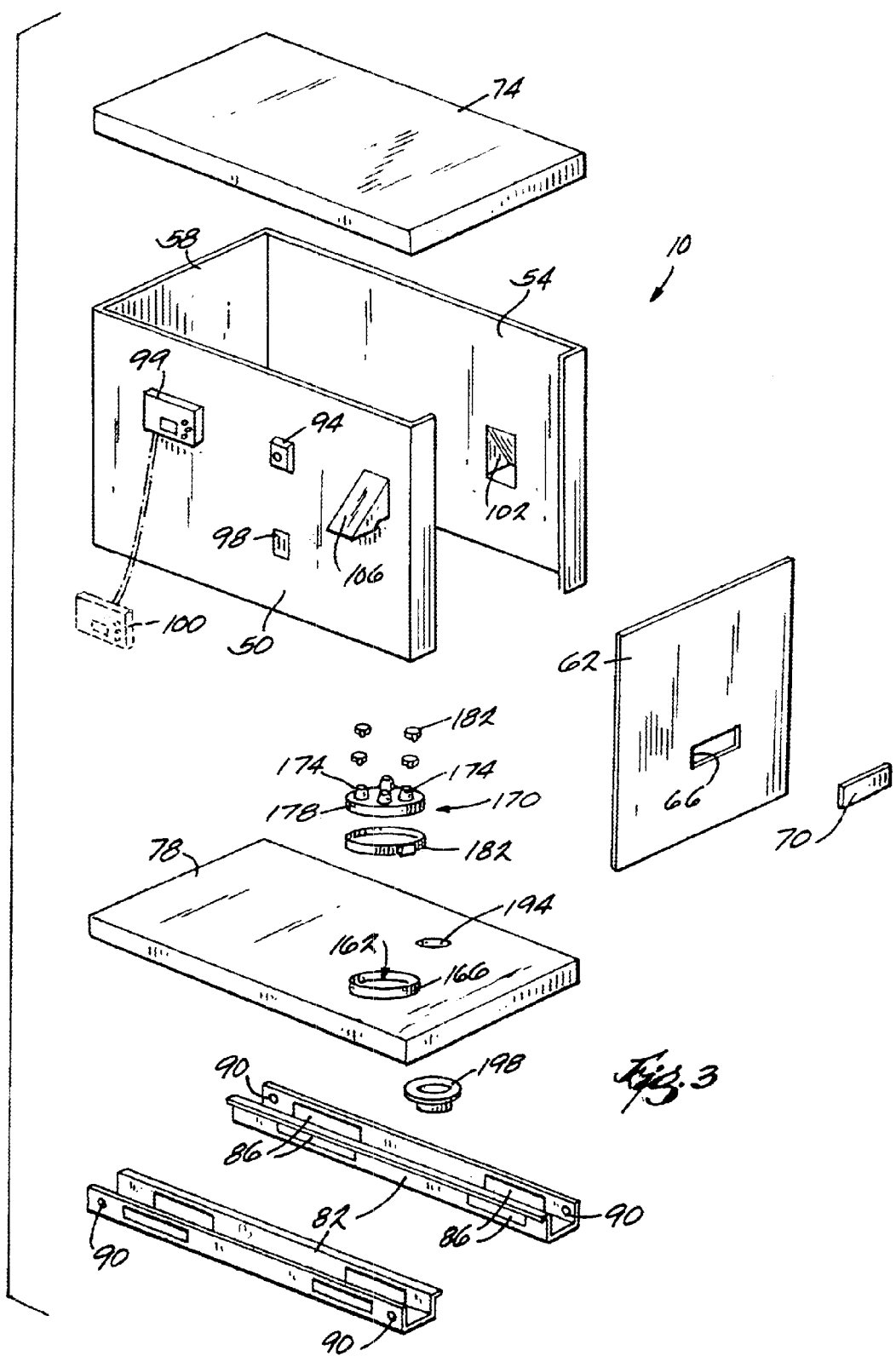
FIG. 3 is an exploded view of the cabinet of the water heater of FIG. 1.
Figure 8:
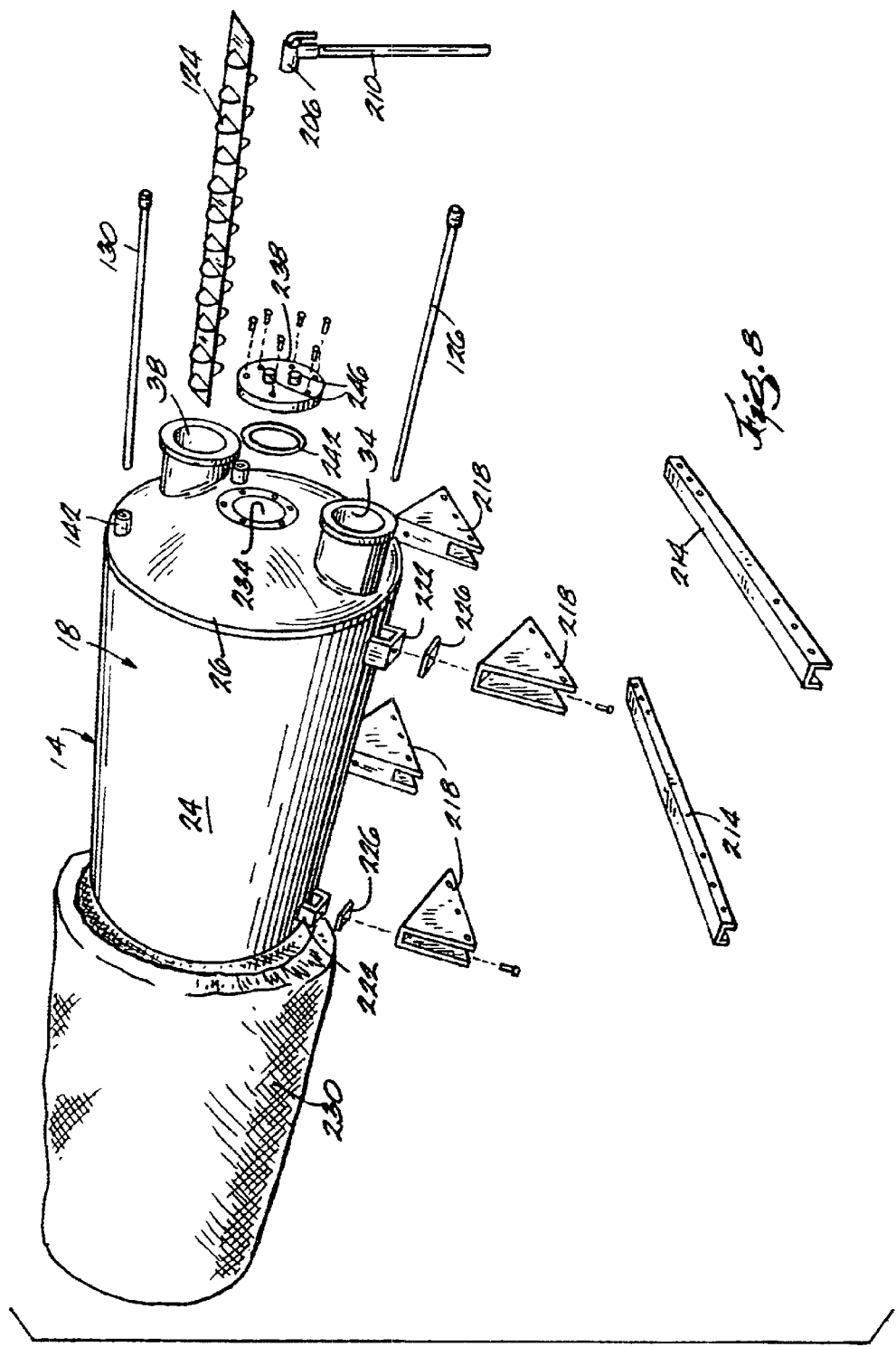
FIG. 8 is an exploded view of the tank assembly of FIGS. 4 and 7.
Figure 10:
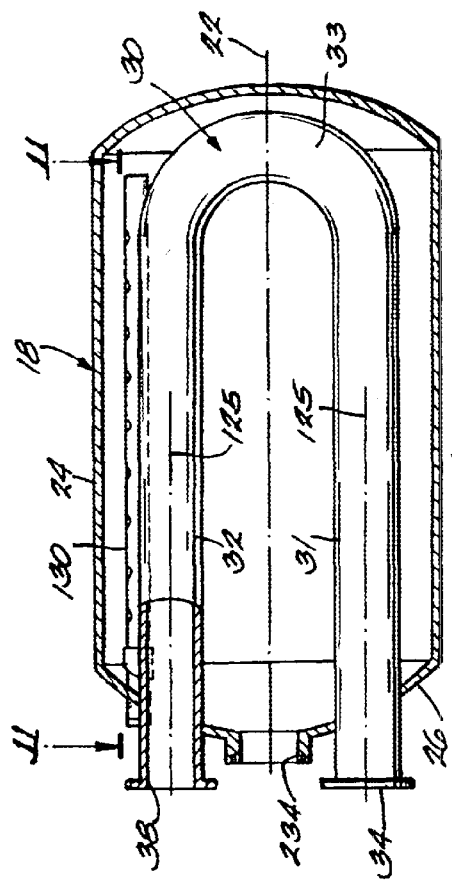
FIG. 10 is a side cross-section view of the tank assembly taken along line 10—10 in FIG. 9.
Figure 9:
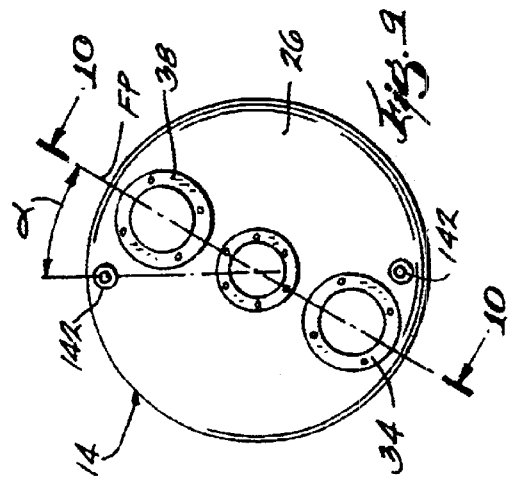
FIG. 9 is an end view of the tank assembly of FIGS. 4 and 7.

The present invention is embodied in a water heater including a cabinet 10 illustrated in FIGS. 1–3 and a tank assembly 14 illustrated in FIGS. 4–13. A first construction of the tank assembly 14 is illustrated in FIGS. 4–11. With particular reference to FIGS. 9 and 10, the tank assembly 14 includes a tank 18 having a substantially cylindrical shape and a horizontally-extending longitudinal axis 22. The tank 18 includes a shell 24 that is closed at one end by a head 26. A U-shaped flue tube 30 is positioned within the tank 18. The U-shaped flue tube 30 includes two legs 31, 32 communicating through a curved or bent portion 33. The legs 31, 32 terminate in a burner end 34 and an exhaust end 38, respectively, both of which extend through the head 26.

Turning to FIGS. 1–3, the cabinet 10 is mounted on a roof curb 42 on a rooftop 46 of a building, and encloses the tank assembly 14. The cabinet 10 is generally rectangular in shape, having its major axis extending generally horizontally. In this regard, the cabinet 10 has a generally low profile and is similar to other rooftop units such as typical HVAC (e.g., air conditioning) units. As used herein, "low profile" means that the rooftop water heater cabinet 10 cannot typically be seen by a person of average height standing at ground level from a distance of about one city block. The low profile therefore permits the unit to be mounted on a rooftop without detracting from the aesthetics of the building. Roof rails and a pitch pocket or small roof curb may be used as an alternative mounting structure to the roof curb 42 illustrated.

As seen in FIG. 3, the cabinet 10 includes two side panels 50, 54 arranged generally parallel to each other and at right angles to a third side panel or end panel 58. A second end panel or cabinet door 62 is releasably attached at right angles to the two side panels 50, 54 and generally parallel to the end panel 58. The door 62 includes a cutout 66 and a recessed or raised handle 70 to facilitate removal of the door 62 from the rest of the cabinet 10 without the use of tools. An upper panel or top 74 is releasably affixed to the top edges of the other panels 50, 54, 58, 62 of the cabinet 10. The top 74 is preferably removable from the rest of the cabinet 10 without the use of tools. Preferably the door 62 and top 74 are locked to the other panels 50, 54, 58 to resist tampering with the tank assembly 14.

A base member 78 supports the cabinet panels 50, 54, 58, 62, 74 and provides the bottom of the cabinet 10. The base member 78 is supported by the roof curb 42, and a foam tape or other sealing member is preferably interposed between the roof curb 42 and the base member 78 to create a water-tight seal therebetween. A pair of rails 82 are mounted to the underside of the base member 78 and straddle the roof curb 42. The rails 82 define channels along their lengths into which the prongs of a conventional fork lift may be inserted for lifting and lowering the water heater, and also include slots 86 to insert the forklift prongs transverse to the channels. The rails 82 also include apertures 90 for attaching the hooks of a lifting crane to facilitate lifting the water heater to the roof 46 of the building.

When the top and door 74, 62 are removed, the tank assembly 14 is sufficiently exposed to permit a service technician to perform service on the water heater. An electrical disconnect button 94 (FIG. 1) is mounted to one of the side panels 50. The disconnect button 94 permits the service technician to conveniently connect and disconnect power to the water heater while the technician is on the rooftop 46. An electrical outlet 98 (FIG. 1) is also provided to accommodate a service technician's power tools and electric lights. Another feature of the water heater is the provision of local and remote controllers 99, 100, respectively, that include thermostats. The local controller 99 may be mounted on the side panel 50 as illustrated, or it may be mounted within the cabinet 10. The remote controller 100 is mounted in a desirable place within the building. The local and remote controllers 99, 100 each include a digital display of the water temperature within the tank 18, and permit adjustment of the temperature. Thus, the water heater may be monitored and controlled from both the rooftop 46 and from within the building. This arrangement creates convenience for both the building owner or occupant within the building and a service technician on the rooftop 46.

The cabinet panels 50, 54, 58, 62, 74 are joined together around the tank assembly 14 in a weather-tight fashion. As used herein, "weather-tight" means that rain or other precipitation falling on the cabinet 10 from above are substantially prevented from entering the cabinet 10 and interfering with the operation of the water heater. For example, one of the side panels 54 includes an air inlet vent 102 that opens downwardly to cause precipitation to run off the cabinet 10, and the other side panel 50 includes a downwardly-opening exhaust vent 106. In addition to being weather-tight, the edges of the cabinet panels 50, 54, 58, 62, 74 are preferably substantially water-tightly joined to each other (e.g., by welding or with gasket material) to resist or prevent water from entering the cabinet 10 and interfering with the operation of the water heater.

Figure 4:
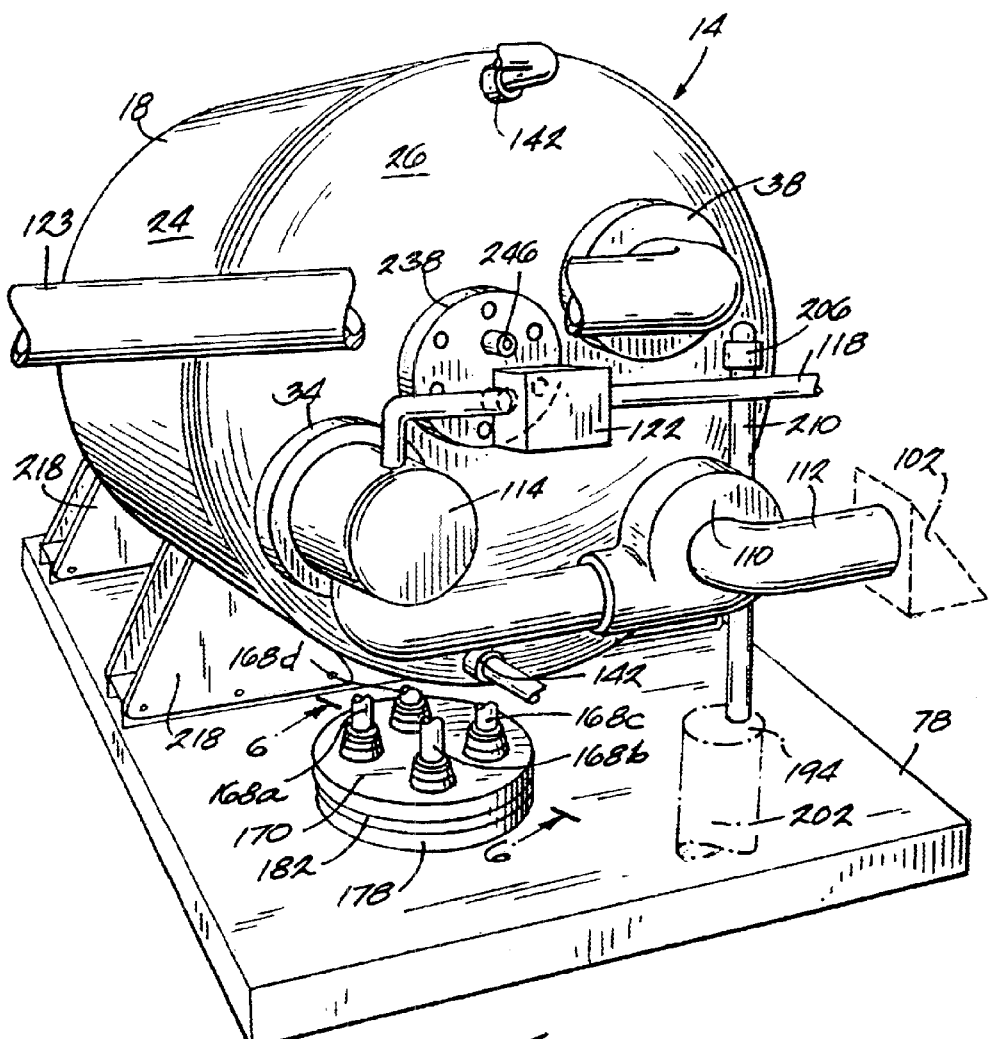
FIG. 4 is a perspective view of the tank assembly of the water heater of FIG. 1.

Turning now to FIG. 4, the tank assembly 14 will be discussed in more detail. A fan or combustion blower 110 communicates with the air inlet vent 102 through an inlet duct 112 to deliver air from outside the cabinet 10 to a gas fuel burner 114 positioned at the burner end 34 of the flue tube 30. Gas fuel is also delivered to the burner 114 via a gas pipe 118 and regulator 122. The burner 114 causes combustion of the air and gas fuel, and the products of combustion are forced through the flue tube 30 by the combustion blower 110. The products of combustion heat the water in the tank 18 through the wall of the flue tube 30, and then exit the exhaust end 38 of the flue tube 30. The exhaust vent 106 communicates with the exhaust end 38 of the flue tube 30 through an exhaust duct 123 to permit the spent products of combustion to be exhausted to the surrounding atmosphere.

With additional reference to FIG. 8, a baffle or turbulator 124 is positioned within one of the legs 31, 32 of the U-shaped flue tube 30, and preferably in the upper leg 32. The legs 31, 32 each include a longitudinal axis 125 (FIG. 10), and the longitudinal axes 125 together define a flue plane FP (FIG. 9) that may be disposed substantially vertically, or may be angled with respect to vertical an angle labeled α. Preferably, the angle α is between 30–60° with respect to vertical.

Referring to FIGS. 8–11, an inlet tube 126 and outlet tube 130 are also mounted in the head 26, and extend substantially parallel to the longitudinal axis 22 of the tank 18. The inlet tube 126 is positioned in the bottom portion of the tank 18 below the longitudinal axis 22, and the outlet tube 130 is positioned in the top portion of the tank 18 above the longitudinal axis 22. Preferably, the inlet tube 126, outlet tube 130, and longitudinal axis 22 of the tank 18 are aligned parallel to each other in a vertical plane. This arrangement is made possible in part because the flue plane angle α is greater than zero (i.e., the flue plane FP is non-vertical), which moves the legs 31, 32 of the flue tube 30 from a position in which they would interfere with the extension of the inlet and outlet tubes 126, 130. The tubes 126, 130 are substantially identical to each other and preferably have a length 132 (FIG. 11) slightly shorter than or substantially the same as the interior length 134 of the tank 18 so that cold water is provided and hot water is removed along the entire interior length 134 of the tank 18. The preferred length 132 is between about 37 and 38 inches, but the length 132 will vary depending on the dimensions of the water tank 18. A threaded end 138 is attached at one end of the tubes 126, 130. The threaded end 138 is threaded into a threaded spud 142 in the tank head 26, and includes additional threads to receive a nipple, water pipe, or other plumbing fixture. In a less preferred embodiment, one or both of the tubes 126, 130 may be significantly shorter than illustrated, or the outlet tube 130 may be removed, leaving only the conventional spud 142 to which the building's hot water pipe communicates.

The end 146 opposite the threaded end 138 is closed. The tubes 126, 130 include a plurality of holes, apertures, or openings 150 along their lengths. The tubes 126, 130 preferably have an outer diameter of about one inch, with the holes 150 having a diameter of about 0.25 inches. The hole spacing 154 is preferably about five inches, with the last hole being spaced from the closed end 146 a distance 158 of about 0.5 inches.

In the illustrated construction, all of the openings 150 in the inlet tube 126 face down and all of the openings 150 in the outlet tube 130 face up. Thus, the inlet tube 126 directs cold water toward the bottom of the tank 18 and the outlet tube 130 draws hot water from the top of the tank 18. This is advantageous because the hottest possible water is drawn from the top by the outlet tube 130 while the inlet tube 126 introduces cold water directly at the bottom of the tank 18. The inlet tube 126 therefore evenly distributes water at the bottom of the tank to minimize mixing and thereby maximize heated water drawn from the tank 18. In alternative less preferred constructions, the openings 150 may be arranged around the periphery of the tubes 126, 130 instead of opening in only one direction.

Figure 6:
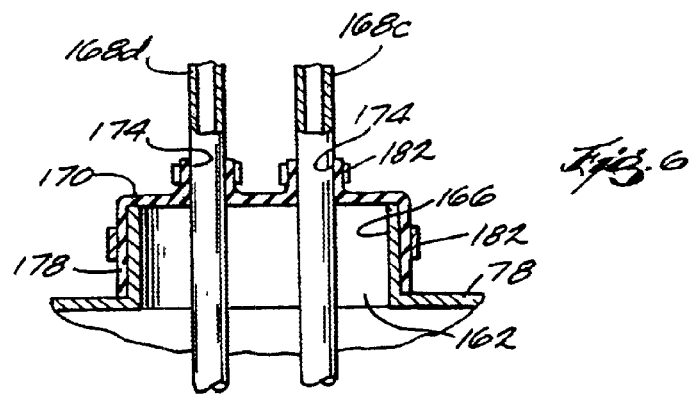
FIG. 6 is a cross-section view taken along line 6—6 in FIG. 4.
Figure 11:
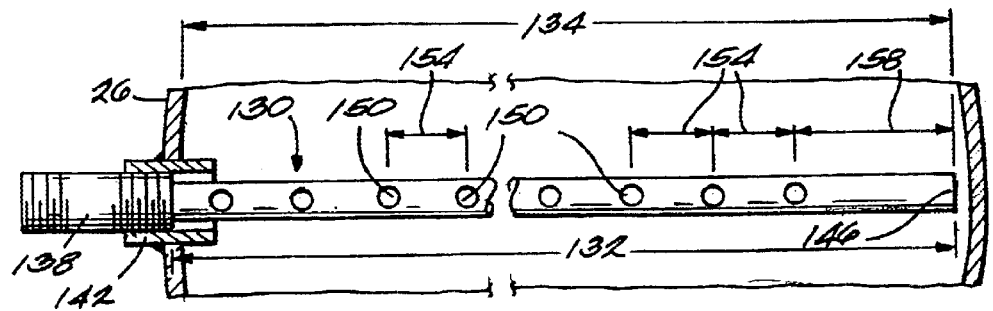
FIG. 11 is a view of the outlet tube taken along line 11—11 in FIG. 10.

As can be seen in FIGS. 3, 4, and 6, the base member 78 includes a water pipe aperture 162 surrounded by a vertical wall 166. Four water pipes 168a, 168b, 168c, 168d (collectively referred to as 168) extend up from the building, through the roof curb 42, and through the aperture 162, and communicate with the water tank 18. A grommet 170 includes apertures 174 water-tightly slip fit around the water pipes 168, and has a depending wall 178 (FIG. 6) water-tightly slip fit over the vertical wall 166. The grommet 170 therefore provides a water-tight seal between the pipes 168 and the base member 78. Suitable clamps 182 can be employed to further tighten the grommet 170 around the vertical wall 166 and pipes 168.

Figure 5:
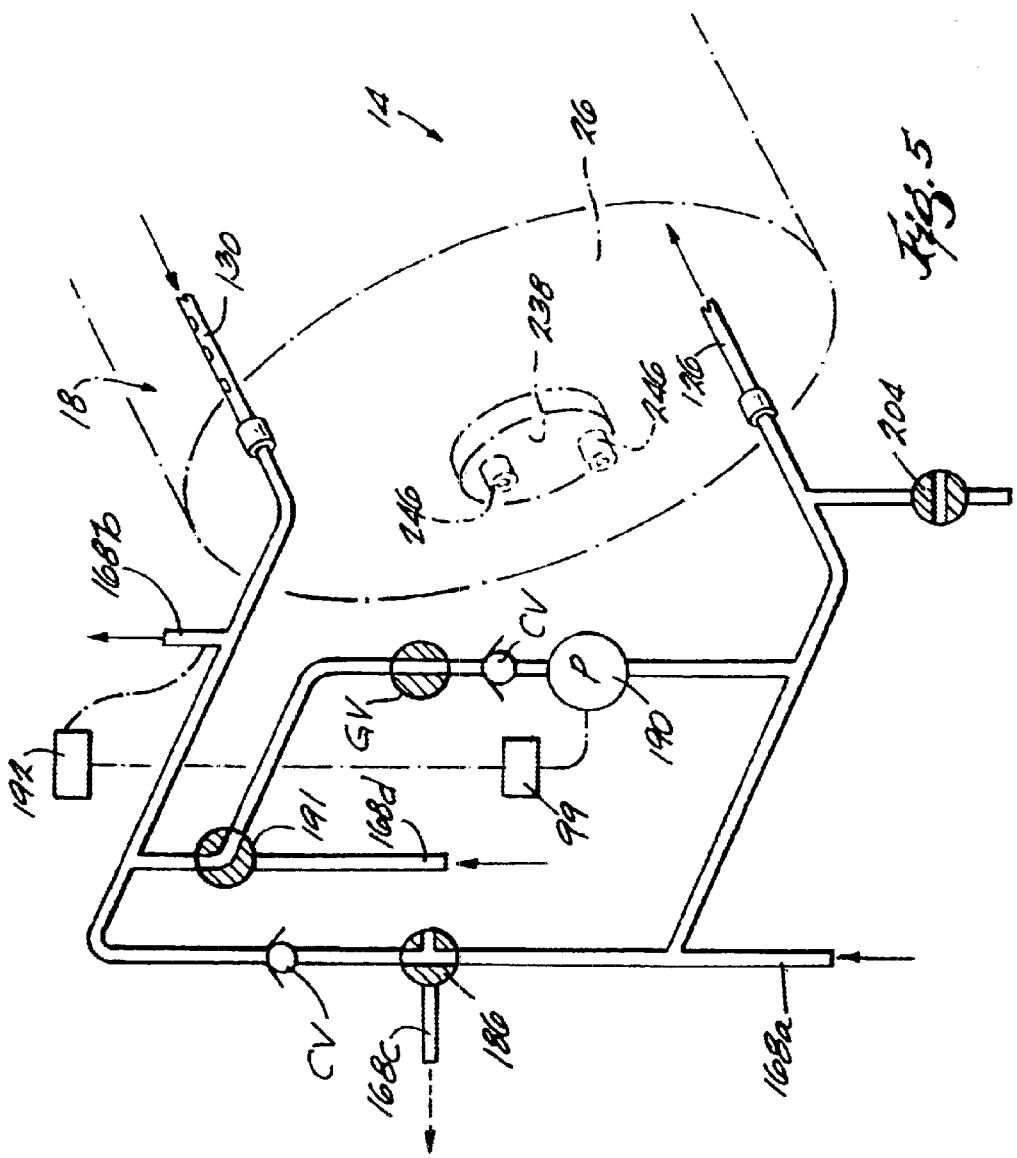
FIG. 5 is a schematic illustration of the piping system associated with the tank assembly of FIG. 4.
Figure 1:
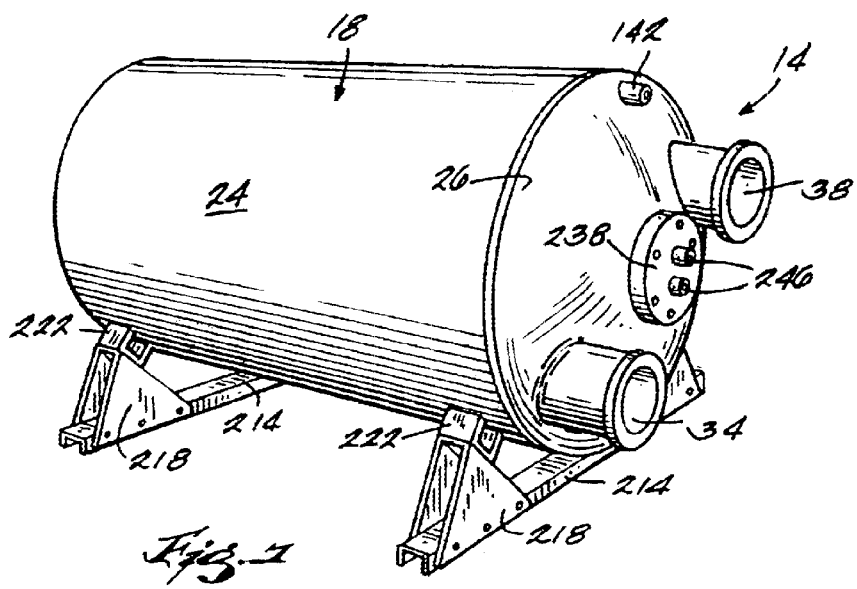

FIGS. 4–6 illustrate the piping system associated with the tank assembly 14. One of the water pipes 168a provides cold water to the water inlet tube 126. Another water pipe 168b removes hot water from the tank 18 through the outlet tube 130, and this hot water is used for dishwashers and other applications requiring very hot water (e.g., between about 120° F. and about 150° F., or a higher temperature if necessary). Another water pipe 168c communicates with a mixing valve 186, and delivers a mixture of hot water and cold water to the warm water faucet of the building's bathrooms and kitchen sink.

The last water pipe 168d communicates between the building's hot water pipes and a circulation pump 190. The circulation pump 190 performs two functions. First, the circulation pump 190 is turned on by the controller 99 (FIG. 1) each time the combustion blower 110 is turned on, and remains active for a set period of time (e.g., about nine minutes) after the combustion blower 110 is turned off. A bypass valve 191 is actuated to route water from the outlet tube 130, through the circulation pump 190, and back into the tank 18 through the inlet tube 126. In this manner, the circulation pump 190 causes hot water to be drawn off the top of the water tank 18 through the outlet tube 130 and recirculated through the cold inlet tube 126 to even out the temperature of the water in the tank 18 and reduce the effects of stacking.

The second function of the circulation pump 190 is to maintain a supply of hot water in the pipes of the building. A thermostat 192 (FIG. 5) may be employed to determine when the temperature in the building's hot water pipes has dropped below an desired temperature (e.g., when a hot water draw has not occurred for an extended period of time). In this case, the bypass valve 191 is turned to permit the circulating pump 190 to circulate the water in the building's hot water pipes into the inlet pipe 126, which forces hot water out the outlet pipe 130 and into pipe 168b. The hot water replaces the water in the building's hot water pipes. The piping system also includes check valves CV and an adjustable gate valve GV (which may be replaced with a fixed valve). The gate valve GV may be used to control the flow rate of recirculated water into and out of the water tank 18.

Referring again to FIG. 3, the base member 78 also includes a drain opening 194 that receives a drain member 198. The drain member 198 communicates with a drain pipe 202 (shown in phantom in FIGS. 1, 2, and 4) in the building, and the drain pipe 202 communicates with the building's sewage system. The drain opening 194 is the only opening in the base member 78 through which water is permitted to flow in the event of a water leak within the cabinet 10. Thus, any water flowing freely within the cabinet 10 drains through the drain opening 194 and is routed to the building's sewage. The tank assembly 14 also includes a drain valve 204 (FIG. 5) that permits the tank 18 to be drained. The valve 204 is preferably positioned over the drain opening 194.

As seen in FIGS. 4 and 8, the water heater also includes a temperature and pressure valve 206, which opens in the event the temperature of the water in the tank 18 becomes too high, or if unacceptable pressure levels are present within the tank 18. A hose or pipe 210 extends down from the temperature and pressure valve 206, and terminates above the drain opening 194. Water is drained from the top of the tank 18 and is fed into the building's sewage system in the event of an overtemperature or overpressure condition in the tank 18.

Referring again to FIGS. 7 and 8, the water tank assembly 14 also includes a pair of support rails 214 extending transverse to the longitudinal axis 22 of the tank 18, and a pair of wedge-shaped supports 218 welded or otherwise affixed to each support rail 214. Tank mounting brackets 222 are attached (e.g., welded) to the tank 18, and a thermally insulated spacer 226 is interposed between the tank mounting brackets 222 and the wedge-shaped supports 218. Suitable fasteners couple the supports 218 to the brackets 222. The tank 18 is surrounded with insulation 230 to reduce heat loss from the tank 18 to the ambient air. The head 26 includes an access opening 234 for cleaning the tank 18 and for applying a glass coating to the inside of the tank 18 during manufacture. An access cover 238 is mounted over the opening 234 and a gasket 242 is employed to prevent leakage of water through the access opening 234. A thermostat and/or an anode tube are mounted in spuds 246 in the access cover 238.

Figure 13:
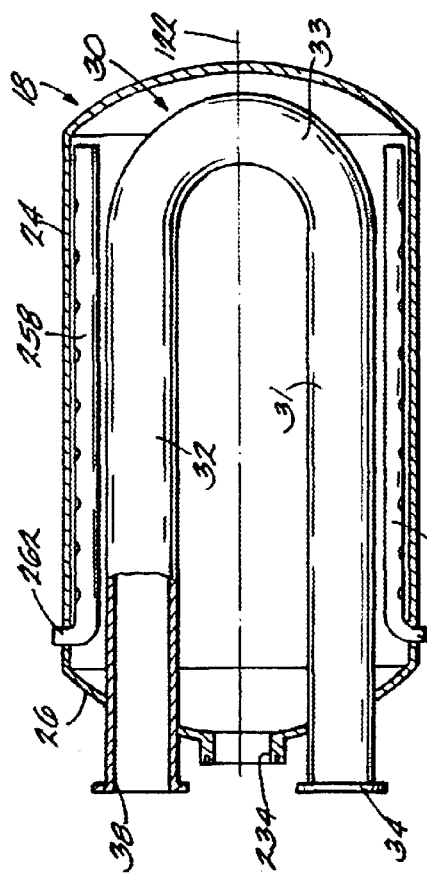
FIG. 13 is a side cross-section view taken along line 13—13 in FIG. 12.
Figure 12:
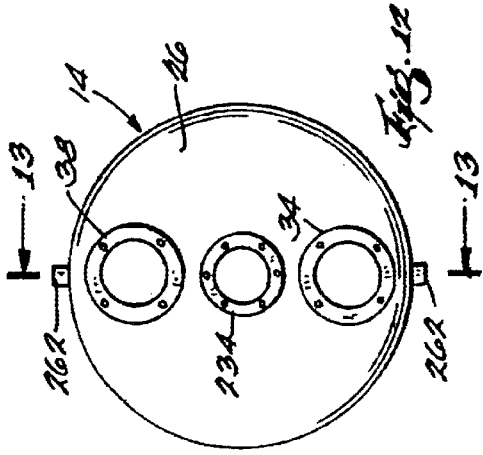
FIG. 12 is an end view of a tank assembly of an alternative construction.

An alternative construction of the tank assembly 14 is illustrated in FIGS. 12 and 13. Here the flue plane FP is substantially vertical, and alternative inlet and outlet tubes 254, 258, respectively, are positioned below and above, respectively, the flue tube 30. A 90° elbow 262 is provided on both the inlet and outlet tube 254, 258 so that the tubes communicate with the building's pipes through the cylindrical shell 24 of the tank 18 and through the insulation 230, rather than through the head 26.

What is claimed is:

1. A method for mounting a water heater on the roof of a building having a plumbing system, the method comprising:
    cutting a hole in the roof;
    securing a roof curb to the roof and around the hole;
    providing a water tank having a longitudinal axis;
    securing the water tank to the roof curb with the longitudinal axis of the water tank extending horizontally;
    extending the plumbing system through the hole; and
    interconnecting the plumbing system to the water tank.

2. The method of claim 1, wherein securing the water tank includes securing a base member to the roof curb and supporting the water tank on the base member.

3. The method of claim 2, further comprising creating a water-tight seal between the base member and the roof curb with a sealing member.

4. The method of claim 2, wherein the base member overhangs the sides of the roof curb, the method further comprising securing a pair of rails to the underside of the base member such that the pair of rails straddle the roof curb when the base member is secured to the roof curb.

5. The method of claim 4, further comprising, prior to securing the water tank, inserting at least one of a prong of a conventional fork lift and a hook of a lifting crane into apertures defined by each of the rails, and raising and lowering the water heater with at least one of the fork lift and crane.

6. The method of claim 2, wherein securing the tank includes providing first and second wedge-shaped supports each having a ramped surface, interconnecting the wedge-shaped supports to the base member with the ramped surfaces facing each other, positioning the tank between the wedge-shaped supports, and interconnecting the tank to the ramped surfaces of the wedge-shaped supports to support the tank.

7. The method of claim 6, wherein securing the tank further includes mounting to the base member a support rail generally transverse to the longitudinal axis of the water tank, and wherein interconnecting the wedge-shaped supports includes mounting the wedge-shaped supports to the rail.

8. The method of claim 6, wherein interconnecting the tank to the ramped surfaces includes interposing thermally insulated spacers between the ramped surfaces and the tank.

9. The method of claim 8, wherein the tank includes a rounded surface, wherein positioning the tank includes positioning the rounded surface between the ramped surfaces, and wherein interconnecting the tank to the ramped surfaces further includes securing mounting brackets to the rounded surface and fastening the mounting brackets to the ramped surfaces with the insulated spacers interposed between the brackets and the ramped surfaces.

10. The method of claim 1, further comprising installing a local controller adjacent to the water tank; installing a remote controller within the building; operably interconnecting the respective local and remote controllers to the water heater; and monitoring and controlling the water heater with the local controller when on the rooftop and with the remote controller when in the building.

11. The method of claim 1, further comprising surrounding the water tank with a cabinet and providing an electrical outlet in the cabinet.

12. The method of claim 1, further comprising weather-tightly securing a cabinet around the water heater.

13. The method of claim 12, further comprising removing at least one of a cover and a door of the cabinet without the use of tools to gain access to the water heater.

14. The method of claim 12, further comprising surrounding the water tank with insulation inside of the cabinet.

15. A building comprising:
    a roof;
    a hole in said roof;
    a plumbing system including a plurality of pipes extending upwardly through said hole;
    a roof curb mounted on said roof around said hole;
    a base member mounted generally horizontally on said roof curb over said hole; and
    a water tank having a longitudinal axis and mounted to said base member such that said longitudinal axis of said water tank is substantially horizontal, said water tank being in fluid communication through said base member with said plurality of pipes to provide heated water to said building.

16. The building of claim 15, further comprising first and second support rails secured to said base member and extending generally perpendicular to said longitudinal axis, and first and second pairs of wedge-shaped supports, each wedge-shaped support having a ramped surface, said first and second pairs of wedge-shaped supports being mounted to said first and second support rails, respectively, with the ramped surface of each wedge-shaped support facing the ramped surface of the wedge-shaped support with which it is paired, wherein said tank is mounted to said ramped surfaces of said wedge-shaped supports.

17. The building of claim 16, wherein said water tank includes a rounded surface positioned between said wedge-shaped supports in each pair, and wherein said rounded surface is mounted to said ramped surfaces.

18. The building of claim 16, further comprising tank mounting brackets secured to said water tank and interconnected with said ramped surfaces; and thermally insulated spacers interposed between said tank mounting brackets and said ramped surfaces.

19. The building of claim 15, further comprising a sealing member secured between the base member and the roof curb to create a water-tight seal therebetween.

20. The building of claim 15, wherein said base member overhangs the sides of said roof curb, and wherein said water heater further includes a pair of rails secured to the underside of the base member and straddling the roof curb.

21. The building of claim 20, wherein said support rails define apertures adapted to receive at least one of a prong of a conventional fork lift and a hook of a lifting crane.

22. The building of claim 15, further comprising a cabinet around said water tank and secured to the base member, said cabinet weather-tightly enclosing said water tank.

23. The building of claim 22, wherein the cabinet includes at least one of a removable cover and a removable door that is removable from the rest of the cabinet without the use of tools.

24. The building of claim 22, further comprising insulation within said cabinet and surrounding the water tank.

25. A support structure for a water heater, the support structure comprising:
a generally horizontal base member;
first and second generally parallel support rails mounted on top of said base member;
a pair of wedge-shaped supports mounted on top of each support rail, each wedge-shaped support including a ramped surface facing the ramped surface of the other wedge-shaped support on the same support rail;
a thermally insolated spacer mounted on each said ramped surface;
four mounting brackets mounted on the water heater, each mounting bracket being aligned with one of said wedge-shaped supports; and
a fastener mounting said mounting bracket to a respective wedge-shaped support with a respective spacer interposed between said mounting bracket and said wedge-shaped support.

26. The support structure of claim 25, wherein the water heater includes a tank having a longitudinal axis, and wherein said wedge-shaped supports support the tank such that the longitudinal axis is generally horizontal.

27. The support structure of claim 25, wherein the water heater includes a water tank having a rounded surface, and wherein said mounting brackets are mounted to the rounded surface and the rounded surface is positioned between the ramped surfaces of said pairs of wedge-shaped supports.

28. The support structure of claim 25, further comprising a cabinet mounted to said base member and weather-tightly enclosing the water heater.

29. The support structure of claim 25, further comprising lifting rails mounted under said base member and adapted to interface with at least one of a fork lift and a lifting crane to facilitate moving said water heater and support structure.

* * * * *